UNITED STATES PATENT OFFICE.

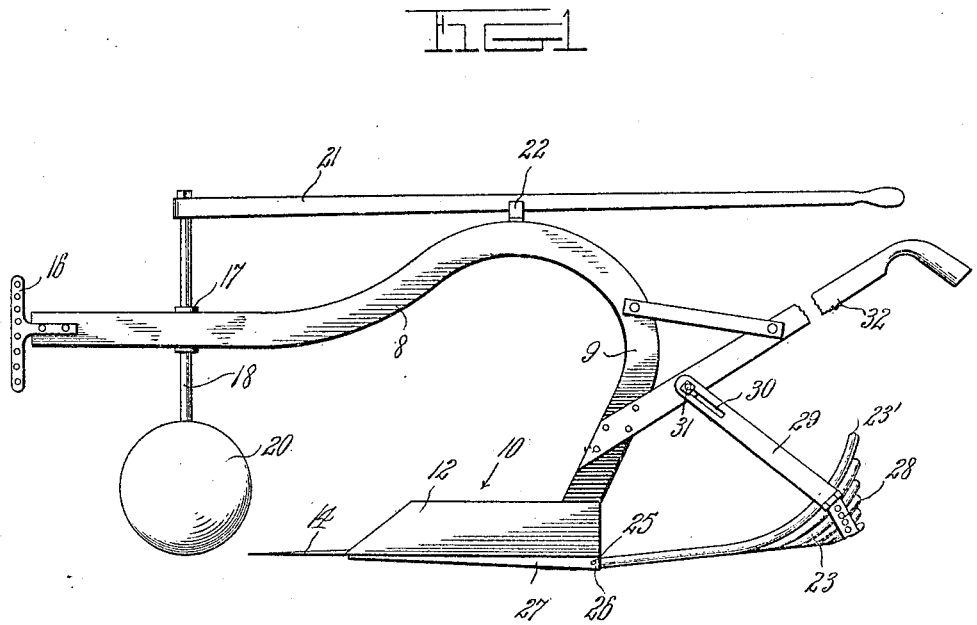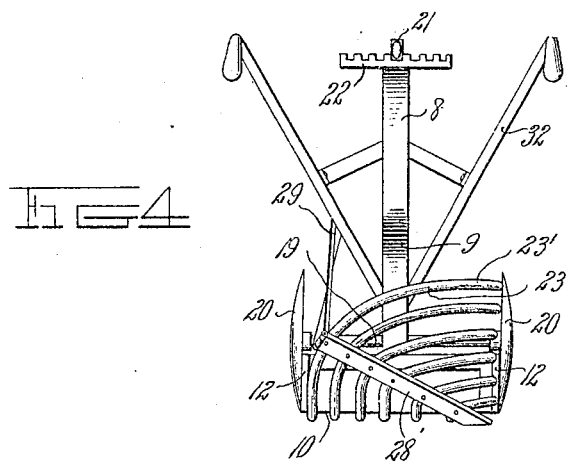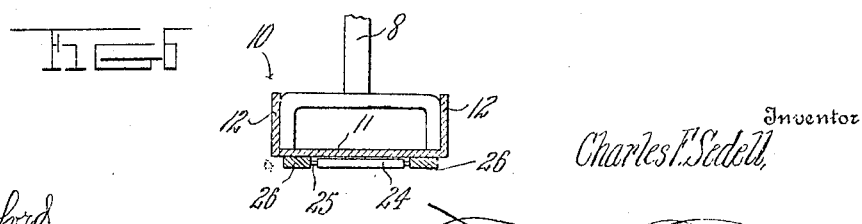

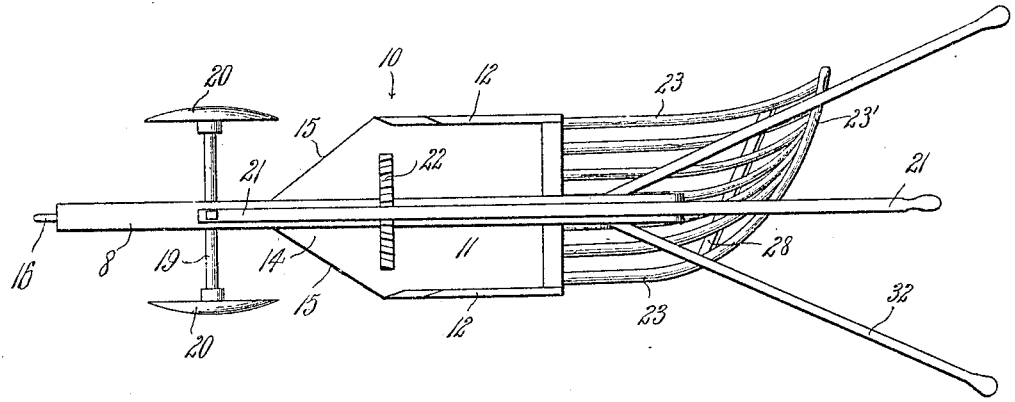
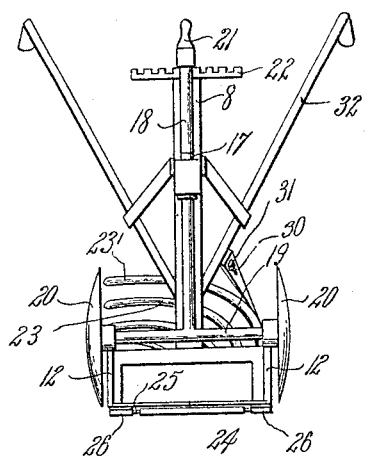
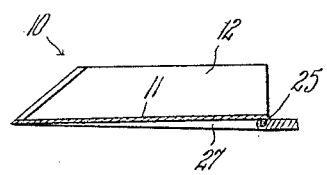

CHARLES F. SEDELL, OF SUTHERLAND, IOWA.

DITCHING-PLOW.

943,897.  Specification of Letters Patent.  Patented Dec. 21, 1909.

Application filed January 14, 1909. Serial No. 472,351.

*To all whom it may concern:*

Be it known that I, CHARLES F. SEDELL, a citizen of the United States, residing at Sutherland, in the county of O'Brien, State of Iowa, have invented certain new and useful Improvements in Ditching-Plows; and I do hereby declare the following to be a full, clear, and exact description of the invention, such as will enable others skilled in the art to which it appertains to make and use the same.

The invention relates to a ditching plow and more particularly to the class of implements for cutting ditches in the ground, when the implement is being advanced over the same.

The primary object of the invention is the provision of a ditching plow which is especially adapted for cutting ditches in the ground whereby the ditches are formed so as to effect proper drainage over the ground or soil and for cleaning out irrigating and drainage ditches so as to restore them to a good condition for service.

Another object of the invention is the provision of a ditching plow in which the shoe thereof will penetrate the ground to form the ditch and means at the rear of the shoe to convey loose dirt to one side of the ditch thus formed during the forward advance of the implement.

A further object of the invention is the provision of a ditching plow in which there is provided means for guiding the plow during its advancement over the ground when in operation for forming a ditch.

The invention is simple in construction, durable, thoroughly efficient in operation and inexpensive in the manufacture.

With these and other objects in view the invention consists in the construction, combination and arrangement of parts as will be hereinafter more fully described, illustrated in the accompanying drawings which disclose the preferred form of embodiment of the invention and brought out in the appended claim. It is to be understood however, that changes, variations and modifications may be made such as come properly within the scope of the appended claim without departing from the spirit of the invention.

In the drawings: Figure 1 is a side elevation of the invention. Fig. 2 is a top plan view thereof. Fig. 3 is a front elevation. Fig. 4 is a rear elevation. Fig. 5 is a sectional view through the scoop of the implement. Fig. 6 is a transverse sectional view through the said scoop.

Similar reference characters indicate corresponding parts throughout the several view in the drawings.

In the drawings, the numeral 8 designates a plow beam the rear end of which is curved downwardly as at 9 to form the foot or standard thereof and to the free end of which is fixedly connected a scoop or shovel 10 the same formed with a flat bottom 11 having rising therefrom at opposite sides upwardly extending side walls 12 and at the forward edge of said bottom 11 is connected a share 14 having angular cutting edges 15 so that upon advancement of the implement the said share 14 is adapted to cut into the ground so as to open a ditch during the travel of the implement.

At the forward end of the plow beam 8 is secured a clevis 16 to which is adapted to be connected the draft animals for advancing the implement over the ground.

Slightly in advance of the scoop or shovel 10 and swiveled as at 17 to the plow beam is a steering standard 18 formed with an axle at its lower end the said axle 19 having mounted thereon at opposite extremities roller colters 20 which latter are adapted to primarily cut opposite sides of a ditch and also to guide the implement in its travel.

Secured to the upper end of the standard 18 and projecting rearwardly therefrom is a hand operable lever 21 which latter is adapted to engage a toothed bar 22 secured to the beam 8 and when the said lever is in engagement with the toothed bar the colters 20 are held against accidental movement. Upon the release of the lever from engagement with the toothed bar 22 it can be shifted to change the course of movement of the said implement.

To the bottom of the scoop or shovel near the rearmost portion thereof is connected a rod mold board comprising a series of spaced bars 23 the same being set close enough together to properly sustain the soil passing over them after leaving the shovel or scoop 10 10 and the inner ends of the said bars being connected to a cross piece 24 the latter pivoted for slight swinging movement vertically by a pivot pin 25 passing through eyes 26 formed on shoes or runners 27 secured to the bottom 11 of the scoop or shovel. The said bars have their free ends curved as at 23' so that the earth or soil engaged by the share 14 and cut by the latter after passing through the scoop or shovel 10 will be carried backwardly and off to one side and deposited at the side of the ditch. Secured to the bars 23 is a brace piece 28 the latter hinged to an adjusting bar 29 the same containing an elongated slot 30 through which passes a bolt fastener 31 mounted in one of a pair of handle bars 32 which latter are secured to the beam 8 for steering and guiding the implement and which are of the ordinary or usual construction.

It will be apparent that by properly manipulating the bolt fastener 31, the adjusting bar 29 can be regulated so as to raise or lower the rod mold board and upon the desired vertical adjustment of the same the bolt fastener 31 is turned so as to lock the mold board in its adjusted position.

It is obvious the clevis is provided with a series of suitable openings so as to permit the attachment of the draft animals to the implement and also permit the adjustment of the attachment which will result in regulating the depth of cut of the share when the implement is being operated.

What is claimed is—

An implement of the class described comprising a scoop having a flat bottom and spaced vertical sides provided with forwardly inclined beveled cutting edges, a cutting edge formed on the front of the bottom, tapering shoes fixed to the outer face of the bottom near the longitudinal side edges thereof, a mold board having a curved free end adapted to discharge earth to one side of the line of draft, a removable pin passed through the shoes and inner end of the mold board to pivotally connect the latter to the scoop, a draft beam fixed to the scoop, and means for adjusting the mold board in raised or lowered position.

In testimony whereof, I affix my signature, in presence of two witnesses.

CHARLES F. SEDELL.

Witnesses:
J. B. MURPHY,
ED. C. BRIGGS.